Nov. 14, 1967   D. F. BOGOSH   3,352,522
TROPHY AND FASTENER
Filed April 12, 1965
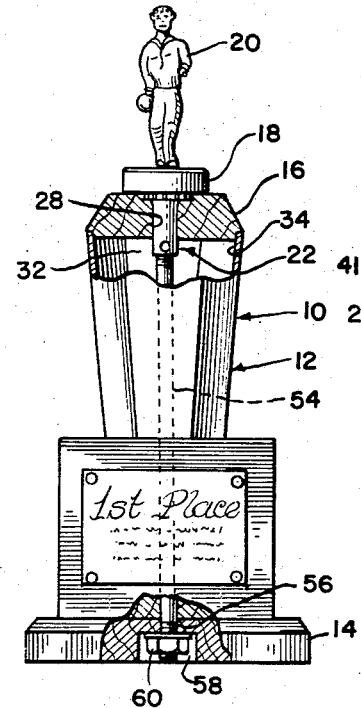
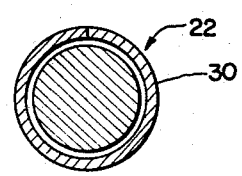
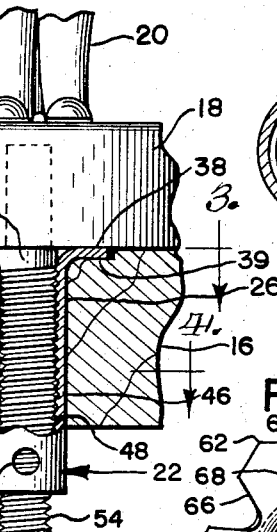
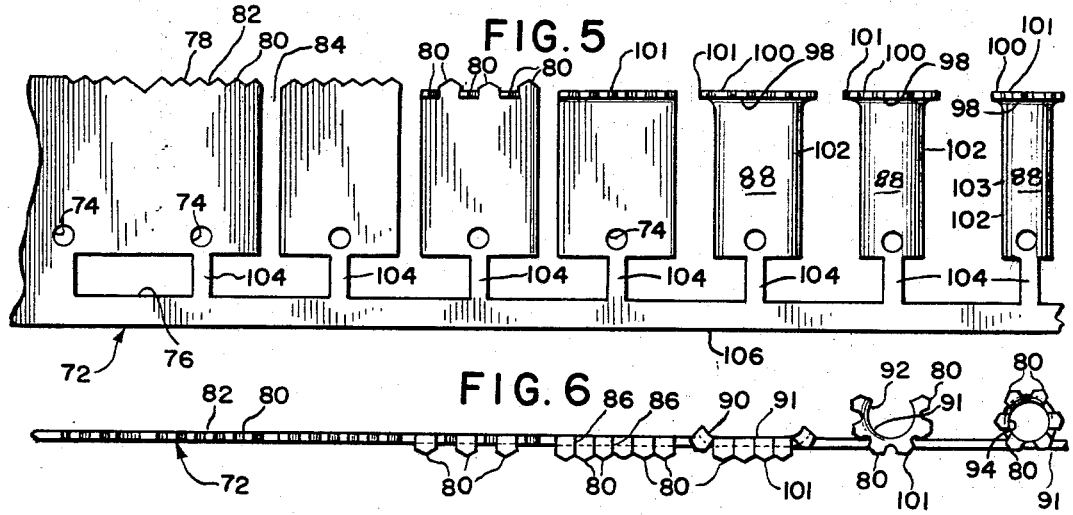
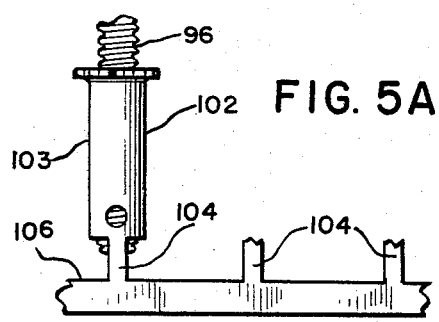
INVENTOR.
Donald F. Bogosh
BY Richard J. Myers
Attorney

United States Patent Office 3,352,522
Patented Nov. 14, 1967

3,352,522
TROPHY AND FASTENER
Donald F. Bogosh, 2646 Willow,
Franklin Park, Ill. 60131
Filed Apr. 12, 1965, Ser. No. 447,256
7 Claims. (Cl. 248—158)

This invention relates to a fastener and in particular to a bushing for securing several parts together as for instance attaching three parts of a trophy together.

When assembling a plurality of parts together as is the case when assembling a trophy, it is necessary to have the parts held through a common fastening member which is held tightly fixed with respect to all the assembly parts and have close and flush engagement of one assembly part with the other with minimum time spent in the assemblage to insure against damage to the unit during the assembly operation.

It is therefore a general object of this invention to provide a fastener for attaching a multiplicity of parts together as in the case of the multiple parts of a trophy whereby the parts can be held tightly flush against one another in a fixed relation.

It is another object of this invention to provide a fastener for the assemblage of trophies and the like which comprises a bushing that is internally threaded for attachment of two trophy parts to each end of a third trophy part receiving the bushing whereby the bushing has a collar with a plurality of alternate angular tabs and slots providing multiple edges for tapping a counterbore in the third trophy part to provide a more flush engagement of the trophy parts adjacent the bushing providing for constrained movement of the bushing in the third part thereby insuring a fixed relation between all of the parts during and after assembly thereof.

Another object of this invention is to provide a trophy fastener in the form of a bushing having a collar that defines a standard type head for receiving a standard size wrench wherein the head is in the form of a hexagon with notches or slots in the flats of the hexagon head to accommodate the standard size wrench to insure proper and tight locking the assembly parts during the assembling thereof.

Still another object of this invention is to provide a novel method of making the trophy bushing.

For further understanding of the invention and of the objects and advantages of the invention, attention is to be directed to the following description and accompanying drawings, and the appended claims which set forth the novelty of the invention.

FIGURE 1 is an elevation view of a trophy partly in section and setting forth the novel aspects of the fastener;

FIGURE 2 is an enlarged view of that portion of the fastener shown in FIGURE 1;

FIGURE 3 is a sectional view taken along line 3—3 of FIGURE 2;

FIGURE 4 is a view taken along line 4—4 of FIGURE 2; and

FIGURES 5 and 5a and FIGURE 6 are elevational and plan views illustrating the novel method of making the fastener.

With reference now to the drawings, and in particular to FIGURES 1 through 4, there is shown a trophy 10 comprising a generally vertically elongated trophy base 12 supported on a generally horizontally extending flat base platform 14 and a figure platform 16 mounted atop the trophy base 12. A figure base cap 18 is mounted on top of the figure platform and has fixedly secured on it a figure 20.

A fastening means is in the form of a bushing 22 that has an elongated shaft 24 with an upper portion 26 extending through the vertically extending base 28 in the figure platform 16 and a lower shaft portion 30 extending into the hollow opening 32 of the trophy base 12 having the cylindrical wall 34 defining the hollow space 32 and a top flange or rim portion 38 with shoulder surface 39 set in counterbore surface 40 of counterbore 41 of the platform 14 that is formed in the upper part of the bore 28. The bushing 22 has a central vertical opening or bore 42 extending through it as defined by its inner cylindrical surface 44 of its wall 46, the wall 46 having its inner surface 44 having internal threads 48 extending the length of the bore 42 for receiving externally threaded stud 50 attached to the underside 52 of the figure platform and extending into the flange and upper shaft portions 34 and 38. A threaded stud 54 extends into the lower shaft portion 30, through the space 32, and through the opening 56 of the base platform 14 and in counterbore 58 where a nut 60 is threaded on the lower end of the stud 54.

The bushing flange in plan view as shown in FIGURE 3 is seen to be hexagonal in shape and is provided with six corners 62 and six sides 64, each side having a generally V-shaped opening or slot 66. The bushing has vertical slot or seam 68 formed during its fabrication and a fabricating locating hole 70. Fabrication of the bushing 22 occurs by the performance of the following novel steps employing a progressive die or other means of stamping out and rolling same from a strip of thin sheet metal or steel as shown by FIGURES 5, 5a and 6 where it is seen that various stages of development of the fabricated bushing is shown. The strip 72 of sheet material or metal is fed through a die means (not shown) and in the first die operation a pilot or guide hole 74 is made and then the strip is advanced forward to make next rectangular slot 76 and a multinotched or V-shaped edge or picket fence surface 78 having a pluraltiy of angular crests 80 and troughs 82 while repeating the previous step of forming the hole 74 on the preceding portion of the strip concurrently. Then next the vertical separation or opening 84 is formed by stamping it out as the strip moves, all previous operations being done simultaneously.

Next the picket fence surface 78 is notched or slit by providing vertical slots 86 between each crest part 80 in each trough 82 and every alternate V-shaped segment or crest part or tab 80 is deflected 90° to its adjacent crest portion 80 to form a plurality of tabs orientated alternately vertically and horizontally as best seen by FIGURES 6 and 7, the previous operations in all instances being repeated on preceding segments of the strip as aforesaid. Next the cut section 88 as defined by the openings 84, 84 is rolled or curled slightly to form a crescent-shaped section 90 having an inner wall 91 and outer wall 102. Then in the next operation the section 88 is further rolled to form surface 91 into a general semi-circular shape portion 92, the subsequent step being to form surface 91 into a closed circular shape portion 94 with seam 95. Next a thread forming tool 96 is inserted in the opening as defined by the now circular surface 91 to form rolled threads therein, the section 88 now being completed as a hollow shaft 103 with bottom surface 100 and top surface 100 of the flange 101. As a last step the hollow threaded shaft 103 is cut or separated from arm or support strip 104. The finished section 88 forms the bushing 22, the various parts 80, 82, 74, 101 and 103 of section 88 corresponding respectively to the parts 62, 64, 70, 38 and 24 of the bushing 22.

The slots 66 of the flange 38 being in the flats 64 of the flange 38 allow good and proper grafting by a tool for tightening the parts of the trophy together as for example whereas a 7/16" hexagonal wrench is used after the corner 62 of the flange lock in the opening of the wrench, whereas if the slots 66 were located in the corner 62 the diametric distance across the longitudinal vertical axis (see FIGURE 2) of the bushing 22 would be reduced and the wrench would slip in the process of tightening of the trophy parts together.

Such bushing construction allows standardization of the bushing in order to conform to standard size wrenches. The corner 62 bites into the counterbore of the trophy part 16 during tightening; the material of part 16 filling into slots 66 to give a good interlocking between the trophy part 16 and the bushing 22. The method of fabrication provides the novel step of punching out a blank and forming of the blank into a threaded bushing heretofore made by boring or extrusion operations not feasible or economical particularly in fabricating thin walled material of the type of bushing as described herein.

While I have illustrated and described the preferred embodiments of my invention, it is to be understood that I do not limit myself to the precise construction herein disclosed and that various changes and modifications may be made within the scope of the invention as defined in the appended claims.

Having thus described my invention, what I claim as new, and desire to secure by U.S. Letters Patent is:

1. A trophy structure comprising a trophy base, a base stand underneath the base, a figure base above the trophy base and a figure mounted on the figure base, means interconnecting the stand and figure base with the trophy base including a one-piece integral bushing extending in the trophy base, said bushing having a hollow shaft and a flange, said stand having connecting means lockingly received in the hollow shaft and said figure base having coupling means lockingly received through the flange into the shaft portion, said flange having polygonal shaped structure having a plurality of flat sides and corners interconnected with one another with a groove in each flat side to define a plurality of tab means spaced apart from one another in a peripheral path and defining between two successive tab means a space for interlocking the trophy base with each tab means.

2. The invention according to claim 1 and each tab means with the others presenting six tabs arrayed in hexagonal pattern, each tab having a corner edge being a distance from the central axis of bushing in excess of the distance of the bottom of the groove from the central axis of the bushing.

3. The invention according to claim 1 and said tab means having a corner edge spaced a distance from the central axis of the bushing in excess of the distance of the bottom of an associated groove from the central axis of the bushing.

4. A trophy structure comprising a trophy base, a base stand for the base, a figure base on the trophy base and a figure mounted on the figure base, means interconnecting the stand and figure base with the trophy base including a one-piece integral bushing with a central opening and extending in the trophy base, said bushing having a hollow shaft and a flange on the shaft, said stand having connecting means lockingly received in the hollow shaft and said figure base having coupling means lockingly received through the flange into the shaft portion, said flange comprising six radial tabs arrayed in a peripheral hexagonal pattern about the central opening of the bushing, each flange tab having a flat surface portion and a corner portion with a groove in each flat surface portion, the distance between the corner portion and the central opening exceeding the distance between the bottom of the groove and the central opening.

5. A one-piece integral bushing for interconnecting three members, the bushing being extendable through one member and provided with coupling means for interconnecting the other two members with said one member, said bushing having a central opening and including a shaft portion and a flange portion through which the opening extends, said flange portion being provided with a plurality of flat sides and corners defining a plurality of radial tab means separated from one another by a groove to define interlocking means for the one member, the tab means extending radially outward a greater extent than the bottoms of the grooves.

6. The invention according to claim 5 and said plurality of tab means defining a six cornered hexagonal shaped flange.

7. A one-piece integral bushing for interconnecting members comprising a threaded hollow shaft and a flange defining a central opening, said flange having six flat sides and six corners defining six tab elements arrayed in a peripheral radial extension about the shaft, each tab being spaced from the other by a groove in each flat side and having a flat and a corner edge extending radially outward from the central opening beyond the bottom of the groove and the flat.

References Cited

UNITED STATES PATENTS

| 2,508,202 | 5/1950 | Van Eastenbridge | 248—158 |
| 2,634,934 | 4/1953 | Martin et al. | 248—158 |
| 2,651,060 | 9/1953 | Misch | 10—86 |
| 2,843,959 | 7/1958 | Flauder | 248—186 XR |
| 2,846,701 | 8/1958 | Bedford | 10—86 |
| 2,849,046 | 8/1958 | Cummaro | 151—41.73 |
| 3,027,670 | 4/1962 | Kramer et al. | 287—53 XR |
| 3,160,188 | 12/1964 | Frank | 151—41.73 |
| 3,180,386 | 4/1965 | Bynum | 151—41.73 |
| 3,230,994 | 1/1966 | Rosan | 151—41.73 XR |

FOREIGN PATENTS 914,529  1/1963  Great Britain.

ROY D. FRAZIER, *Primary Examiner.*

CLAUDE A. LEROY, *Examiner.*

R. P. SEITTER, *Assistant Examiner.*